Figure 1:
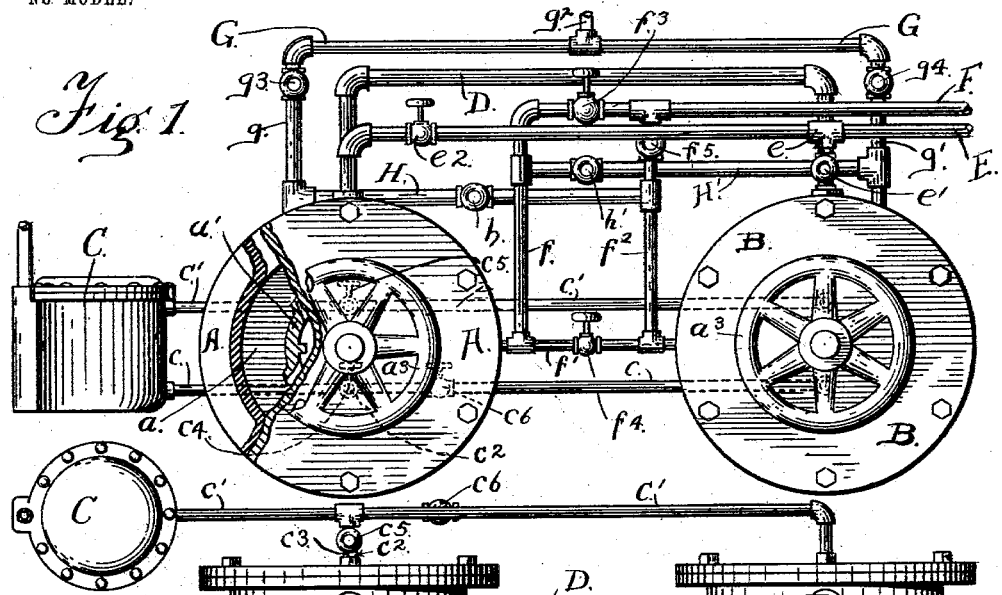

No. 748,687. PATENTED JAN. 5, 1904.
F. H. BATES.
PROCESS OF GENERATING GAS.
APPLICATION FILED SEPT. 14, 1903.
NO MODEL.

Witnesses:
Arthur T. Lee
Walter T. Vane

Inventor
Frank H. Bates
by Wm. F. Booth
his attorney

No. 748,687. Patented January 5, 1904.

UNITED STATES PATENT OFFICE.

FRANK H. BATES, OF SAN FRANCISCO, CALIFORNIA.

PROCESS OF GENERATING GAS.

SPECIFICATION forming part of Letters Patent No. 748,687, dated January 5, 1904.

Application filed September 14, 1903. Serial No. 173,043. (No specimens.)

*To all whom it may concern:*

Be it known that I, FRANK H. BATES, a citizen of the United States, residing in the city and county of San Francisco, State of California, have invented certain new and useful Improvements in Processes of Generating Gas; and I do hereby declare the following to be a full, clear, and exact description of the same.

My invention relates to the generation of vapor for explosive-engines and, though applicable to the use of any hydrocarbon, is especially intended to apply to the comparatively modern practice of the use of crude oil as the hydrocarbon from which to generate the vapor. In this practice the oil is heated in a generator by suitable means, usually by the exhaust-gases from the engine, and the vapor thereby driven off is conducted from the generator to the engine, thus furnishing in high degree an economical coöperation of generator and engine. The most simple and readily-suggestive manner of generating the vapor—namely, that of heating an appreciable body of oil in the generating-chamber—has heretofore been found open to such serious objections that its employment has been thought inadvisable, and the accepted practice is that of passing a continuous attenuated stream or flow of oil through a somewhat prolonged course in the generator with a view to effecting the necessary separation of the vapor and disposing of the residuum as fast as the oil is furnished, thereby acting on fresh oil all the time and keeping up the standard of richness of the vapor. It will readily be seen that this result cannot be had in a generating-chamber wherein an appreciable body of oil is confined, for the reason that the fresh oil which is continuously supplied to maintain the volume is constantly and increasingly impoverished by dissolving or mixing with the ever-increasing volume of undisposed of residuum, so that there comes a time when the oil in the chamber is not rich enough to furnish the required vapor and the generator must be shut down for a clean-out, which is a loss of time; but in addition to this the contents of the generator, though not rich enough to furnish vapor of the required standard, is still capable of giving off some useful vapor, which will be lost if the oil is thrown away before yielding up its still volatile portions.

The object of my invention is to secure the generation of vapor from confined bodies of oil maintained at given volumes by the feed of fresh oil, the vapor generated being of the required richness and the oil reduced to a worthless residuum, the operation or service being continuous and without shut-down.

To this end my invention consists in the process or method of vapor-generation, which I shall hereinafter fully describe and claim.

In the accompanying drawings I show an apparatus in which my process may be carried out.

Figure 2:
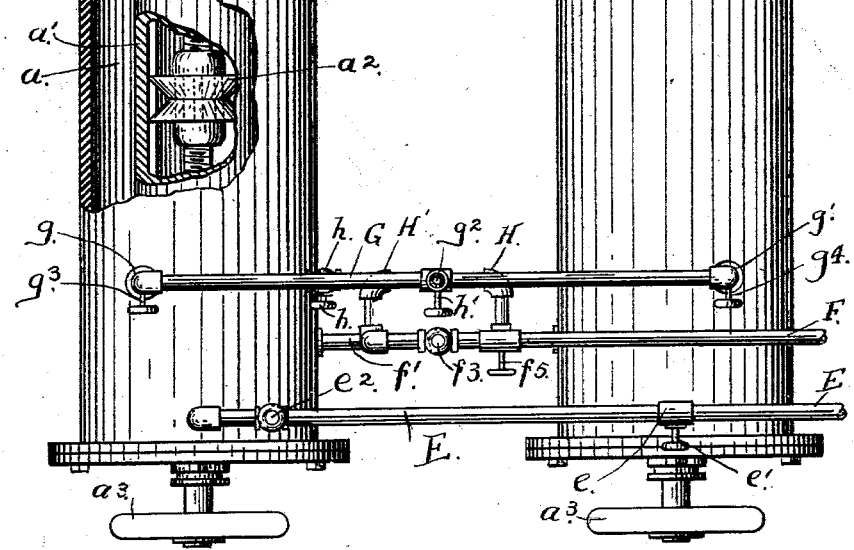

Figure 1 is an end view, partly broken, to show the interior parts of one of the generators. Fig. 2 is a plan of same, partly broken.

A is one generator, and B is another. The two are alike, and what is said of the construction of one applies equally to the other. Generator A will serve to illustrate both. I have broken away generator A sufficiently to indicate the heating-space $a$ within the outer shell, also the inner cylinder $a'$, which is the vapor-generating chamber and which contains the oil, also the perforated scraper-disk $a^2$, which by suitable means operated by a hand-wheel $a^3$ at the end is adapted when operated to travel lengthwise of the vapor-chamber in order by frictional contact with its walls to scrape the carbonized incrustations therefrom when required.

C is the oil-feed controller to be connected with a suitable source of oil. It is connected, as shown, to the vapor-chambers of both generators A and B. This connection comprises a lower or feed pipe $c$ from the controller to generator B, an upper or equalizer pipe $c'$ from generator B back to the controller, and branch pipes $c^2$ and $c^3$ from the feed-pipes $c$ and $c'$, respectively, to the generator A. I need only state the purpose of this controller and its connections is to supply oil to the generators as required to keep the volume of said oil constant. In the branch pipes $c^2$ and $c^3$ are the cocks $c^4$ and $c^5$, respectively, and in the feed-pipe $c$, at a point between the two generators, is a cock $c^6$.

D is a pipe which directly connects the vapor-chambers of the two generators.

E is a pipe which issues from the vapor-chamber of generator A and thence passing by generator B may be supposed to extend to and communicate with the engine. From this pipe E a branch pipe $e$ communicates with the vapor-chamber of generator B. This branch pipe $e$ is controlled by a cock $e'$, and the pipe E between the two generators has a cock $e^2$.

F is a pipe which may be supposed to extend from the exhaust of the engine, said pipe being the inlet for the exhaust-gases to the generators to furnish the heat for vaporizing the oil. This pipe has a branch $f$ down to a pipe $f'$, which latter connects the heating-spaces of the two generators. Pipe F has a second branch pipe $f^2$, which connects with pipe $f'$. In pipe F, between the two branches $f$ and $f^2$, is a cock $f^3$, and in pipe $f'$, between said branches $f$ and $f^2$, is a cock $f^4$.

From the heating-space of generator A issues a pipe $g$, and from the heating-space of generator B issues a pipe $g'$. These pipes $g$ and $g'$ communicate with opposite ends of a pipe G, which, with its branch $g^2$, constitutes the exhaust-gas outlet from the two generators. Cross connections between the inlet and outlet systems are made as follows: A pipe H leads from outlet-pipe $g$ of generator A to the inlet branch $f^2$ of generator B, and a pipe H' leads from outlet-pipe $g'$ of generator B to the inlet branch $f$ of generator A. Controlling-cocks of this exhaust-gas system are as follows: In outlet-pipe $g$ of generator A is a cock $g^3$ beyond the connection of said pipe with the cross-pipe H. In outlet-pipe $g'$ of generator B, beyond its connection with cross-pipe H', is a cock $g^4$. In cross-pipe H is a cock $h$, and in cross-pipe H' is a cock $h'$. In inlet branch $f^2$ of generator B at a point between its connections with main inlet-pipe F and cross-pipe H is a cock $f^5$.

My process can now be described and will readily be understood. To begin with, oil is supplied from the feed-controller C through feed-pipe $c$ and branch $c^2$ to the vapor-chamber of generator A, and the pressure is equalized through branch $c^3$ and pipe $c'$. At this time cocks $c^4$ and $c^5$ are open and cock $c^6$ is closed. The level of the oil in generator A is maintained by the controller, and as its volume is reduced by the separation of the vapor under heat it is restored by the controller which supplies fresh oil to maintain the level required. At this time heat is supplied to both generators as follows: The exhaust-gases from the engine pass through pipe F, branch $f$, and pipe $f'$ into the heating-space of generator A, cock $f^3$ being open, while cocks $h'$, $f^5$, and $f^4$ are closed. The exhaust-gases from generator A pass into pipe $g$ through pipe H, branch $f^2$, and pipe $f'$ into the heating-space of generator B, cock $g^3$ being closed and cock $h$ being open. From generator B they pass through pipe $g'$, pipe G, and branch $g^2$, the cock $g^4$ being open and cock $h'$ closed. Now as the vapor is generated in the vapor-chamber of A it passes through pipe D into the vapor-chamber of B. Therein it is dried thoroughly, and by passing through the perforated scraper-disk which is in said chamber (similar to the perforated scraper-disk $a^2$, which is shown in chamber $a'$ of generator A) the entrained oil which it carries over is separated from it, thereby materially purifying it. Then dried and purified, as stated, the vapor passes from generator B up through branch $e$ and pipe E to the engine. To permit this course, the cock $e^2$ of pipe E is closed, and the cock $e'$ of branch $e$ is open. This condition of things continues until by the gradual accumulation of the residuum in generator A and the impoverishment of the volume of oil by a solution or mixture, of which said residuum now forms so large a part, there comes a point when the oil in said generator is not rich enough to furnish the necessary gas. Thereupon a change is made as follows: The feed of oil is cut off from generator A by closing cock $c^4$, and the oil is supplied to generator B by opening cock $c^6$. The controller C now furnishes and maintains the necessary volume of oil in generator B. The course of the heating exhaust-gases from the engine is changed as follows: They pass from pipe F down branch $f^2$ and through pipe $f'$ into B, cock $f^3$, cock $h$, and cock $f^4$ being closed and cock $f^5$ being open. From B they pass out through pipe $g'$, cross-pipe H', down branch $f$, and through pipe $f'$ into A, cock $g^4$ being closed and $h'$ open. From A they pass out through $g$, pipe G, and branch $g^2$, cock $g^3$ being being open and cock $h$ closed. The vapor-course is also changed. The vapor passes from B through pipe D into A. Here it is dried and purified as before, and in addition it mingles with whatever vapor is still generated in A, because the heat is still being applied to A. Now it will be seen that without shutting down rich vapor is still being generated, and in addition whatever value remains in the oil in generator A is being saved. The vapor passes from A through pipe E to the engine, this course being possible by closing cock $e'$ and opening cock $e^2$. Now during the time that generator B is in operation and before it can reach the end of its full efficiency it will be seen that the oil in A is yielding up all its volatile constituents, and by continuing the process this oil can in practice be worked down to a powder, a result which could not be reached heretofore by a continuous operation or as long as fresh oil was supplied. As soon as the oil in generator A has been reduced to worthlessness, the detritus can be discharged by the scraper without stopping the operation, and then when the oil in generator B has become too poor to yield sufficiently rich vapor the change is made again, and A is thrown into full operation and the oil in B is worked down. If at any time it becomes necessary to cut either generator out entirely, to tide over some trouble, it can be done by proper manipulation of the cocks. Thus if generator B should have to be cut out the cock $c^6$ will be closed, so that no oil will pass to it, and the cocks $f^5$, $h'$, $h$, $g^4$, and $f^4$ will be closed, so that no heat can pass to it. Similarly with generator A. Thus the apparatus can be run as a single retort when necessary, and continuous service without shutdown can be had.

Having thus described my invention, what I claim as new, and desire to secure by Letters Patent, is—

The process of vapor-generation, which consists in heating a body of oil the volume of which is kept constant by fresh additions, until, by the mixture of the ever-increasing residue with the fresh oil, the mass becomes too impoverished to yield vapor of the required richness, and thereupon cutting off the fresh additions of oil to said body; then heating a second body of oil, whose volume is kept constant in like manner as the first body, continuing, meanwhile, the heating of the first body, and mingling with the impoverished vapor of the first body the richer vapor of the second body, until the first body has ceased, substantially, to yield any useful vapor, and the second body has become too poor to yield vapor of the required richness; then renewing the first body, keeping its volume constant as in the first instance, and continuing its heat, while the second body has its fresh additions of oil cut off and its heat continued, and mingling the rich vapors of the first body with the impoverished vapors of the second body, until the latter yields, substantially, no useful vapor, and the first body has ceased to furnish vapor of the required richness; then reversing the process as before, and so on.

In witness whereof I have hereunto set my hand.

FRANK H. BATES.

Witnesses:
  WALTER F. VANE,
  D. B. RICHARDS.